United States Patent
Lee

(10) Patent No.: US 10,047,855 B2
(45) Date of Patent: Aug. 14, 2018

(54) METHOD AND APPARATUS FOR CONTROLLING TRANSMISSION OF VEHICLE

(71) Applicant: HYUNDAI MOTOR COMPANY, Seoul (KR)

(72) Inventor: Soo Bang Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 118 days.

(21) Appl. No.: 15/379,183

(22) Filed: Dec. 14, 2016

(65) Prior Publication Data

US 2018/0094721 A1  Apr. 5, 2018

(30) Foreign Application Priority Data

Oct. 4, 2016 (KR) .................. 10-2016-0127482

(51) Int. Cl.
*F16H 59/44* (2006.01)
*F16H 61/02* (2006.01)
*F16H 59/52* (2006.01)
*F16H 59/66* (2006.01)

(52) U.S. Cl.
CPC ......... *F16H 61/0213* (2013.01); *F16H 59/44* (2013.01); *F16H 59/52* (2013.01); *F16H 59/66* (2013.01); *F16H 2059/525* (2013.01); *F16H 2059/663* (2013.01); *F16H 2061/0227* (2013.01)

(58) Field of Classification Search
None
See application file for complete search history.

(56) References Cited

U.S. PATENT DOCUMENTS

| 5,927,415 A | 7/1999 | Ibaraki et al. |
| 6,275,760 B1 * | 8/2001 | Saito .................. F16H 61/0213 477/901 |
| 6,609,056 B1 * | 8/2003 | Czarnecki ............. B60K 31/04 477/110 |
| 7,672,770 B2 * | 3/2010 | Inoue ..................... B60L 11/14 701/70 |

(Continued)

FOREIGN PATENT DOCUMENTS

| JP | 2004-68967 A | 3/2004 |
| JP | 2007-191141 A | 8/2007 |

(Continued)

OTHER PUBLICATIONS

Notice of Allowance dated Oct. 25, 2017 in corresponding Korean Application No. 10-2016-0127482—2 pages.

*Primary Examiner* — Dirk Wright
(74) *Attorney, Agent, or Firm* — Knobbe Martens Olson & Bear LLP

(57) ABSTRACT

A method of controlling a transmission device in a vehicle includes determining a basic shift pattern according to whether towing is performed and road inclination during vehicle driving, determining first energy consumption according to loads of operating devices in the vehicle, determining second energy consumption according vehicle speed and the road inclination, comparing the first and second energy consumptions and a state of charge (SoC) of a battery to determine an energy compensation pattern, and determining a last shift pattern so as to correspond to the basic shift pattern and the energy compensation pattern.

20 Claims, 7 Drawing Sheets

(56) References Cited

U.S. PATENT DOCUMENTS

| | | | |
|---|---|---|---|
| 7,967,090 B2 | 6/2011 | Atarashi et al. | |
| 8,346,449 B2* | 1/2013 | Heap | B60K 6/445 |
| | | | 701/55 |
| 8,515,635 B2* | 8/2013 | Spaulding | F16H 59/0217 |
| | | | 180/370 |
| 8,977,415 B2* | 3/2015 | Tiberg | B60W 40/13 |
| | | | 180/6.48 |
| 2007/0271017 A1* | 11/2007 | Samie | F16H 61/0213 |
| | | | 701/55 |
| 2008/0293541 A1* | 11/2008 | Kanafani | F16H 61/10 |
| | | | 477/110 |

FOREIGN PATENT DOCUMENTS

| | | |
|---|---|---|
| JP | 4792519 B2 | 10/2011 |
| JP | 2014-8951 A | 1/2014 |
| JP | 5790781 B2 | 10/2015 |
| KR | 10-2002-0030356 A | 4/2002 |
| KR | 10-2007-0052498 A | 5/2007 |
| KR | 10-2014-0021220 A | 2/2014 |
| KR | 10-2016-0003748 A | 1/2016 |

\* cited by examiner

METHOD AND APPARATUS FOR CONTROLLING TRANSMISSION OF VEHICLE

This application claims the benefit of Korean Patent Application No. 10-2016-0127482, filed on Oct. 4, 2016 in the Korean Intellectual Property Office, the disclosure of which is hereby incorporated by reference in its entirety as if fully set forth herein.

BACKGROUND

Field

The present disclosure relates to a method and apparatus for controlling a transmission of a vehicle.

Discussion of the Related Art

A transmission installed in a vehicle is a device for changing and adjusting a speed ratio between an engine and a wheel. In general, a transmission facilitates effective use of an engine torque according to a driving environment and condition of a vehicle using gears with several levels appropriate for high speed to low speed driving. The transmission may be manually operated by a driver or automatically controlled without driver manipulation.

In order to control speed according to a driving environment during driving, a vehicle needs to effectively control a transmission. In general, shift control is performed according to a predetermined shift pattern. Effective control of a transmission is also necessary for a hybrid vehicle and an electric vehicle.

SUMMARY

Another aspect of the present invention is to provide a method and apparatus for controlling a transmission device with different patterns so as to correspond to the case in which weight change in a vehicle greatly occurs like towing in a hybrid vehicle or an electric vehicle.

Still another aspect of the present invention is to provide a method and an apparatus, for calculating a grade during towing with respect to an actual road load using a difference between a wheel torque and driving resistance calculated based on a basic weight of the vehicle in order to enter a shift pattern for towing and to pre-determine weight increment and driver acceleration intention in the case of towing of a predetermined range or a weight or more and comparing the calculated grade with a grad in a general situation to set and apply a control pattern of the transmission device.

Additional advantages and features of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

In one further aspect of the invention, a method of controlling a transmission device in a vehicle includes determining a basic shift pattern according to whether towing is performed and road inclination during vehicle driving, determining first energy consumption according to loads of operating devices in the vehicle, determining second energy consumption according vehicle speed and the road inclination, comparing the first and second energy consumptions and a state of charge (SoC) of a battery to determine an energy compensation pattern, and determining a last shift pattern so as to correspond to the basic shift pattern and the energy compensation pattern.

The determining of the basic shift pattern may further include determining weight change of the vehicle according to whether towing is performed and the towing, comparing the weight change of the vehicle and a threshold value, and determining the basic shift pattern according to a comparison result.

The determining of the basic shift pattern according to the comparison result may include at least one of determining at least one of first shift patterns as the basic shift pattern according to the road inclination (grade), and determining at least one of second shift patterns as the basic shift pattern so as to correspond to the road inclination (grade) and a weight parameter.

The determining of the shift pattern according to the road inclination (grade) may include comparing the road inclination with a first threshold value, comparing the road inclination with a second threshold value when the road inclination is greater than the first threshold value, comparing the road inclination with a third threshold value when the road inclination is greater than the first threshold value, and determining one of four shift patterns according to a comparison result of the second threshold value and the third threshold value, wherein the first threshold value is smaller than the second threshold value and is greater than the third threshold value.

The determining of the basic shift pattern so as to correspond to the road inclination (grade) and a weight parameter may include determining a towing grade corresponding to the road inclination (grade) and the weight parameter, comparing the towing grade and the first threshold value, comparing the towing grade with the second threshold value when towing grade is greater than the first threshold value, and determining one of three shift patterns according to a comparison result of the first threshold value and the second threshold value.

The determining of the first energy consumption may include recognizing an amplitude of the vehicle, calculating whether an electronic device including an air conditioning system and an audio-video-navigation system installed in the vehicle is used and power consumption of the electronic device, determining operating load based on user operating preference information according to driving environment information, and determining the first energy consumption so as to correspond to the amplitude, whether the electronic device is used, power consumption of the electronic device, and the operating load.

The determining of the energy compensation pattern may include adding the first energy consumption to a low power state entrance threshold value to determine a first parameter, adding the second energy consumption to the low power state entrance threshold value to determine a second parameter, determining a current SoC of a battery installed in the vehicle as a third parameter, and comparing the first parameter, the second parameter, and the third parameter to determine the energy compensation pattern.

In another aspect of the present invention, an apparatus is for controlling a transmission device in a vehicle including a processing system that comprises at least one data processor and at least one computer-readable memory storing a computer program. Herein, the processing system is configured to cause the apparatus to: determine a basic shift pattern according to whether towing is performed and road inclination during vehicle driving, determine first energy consumption according to loads of operating devices in the vehicle, determine second energy consumption according vehicle speed and the road inclination, compare the first and second energy consumptions and a state of charge (SoC) of a battery to determine an energy compensation pattern, and determine a last shift pattern so as to correspond to the basic shift pattern and the energy compensation pattern.

Further, a non-transitory computer readable medium can store a program causing a processing system to execute a process for controlling a transmission device in a vehicle. The process includes determining a basic shift pattern according to whether towing is performed and road inclination during vehicle driving, determining first energy consumption according to loads of operating devices in the vehicle, determining second energy consumption according vehicle speed and the road inclination, comparing the first and second energy consumptions and a state of charge (SoC) of a battery to determine an energy compensation pattern, and determining a last shift pattern so as to correspond to the basic shift pattern and the energy compensation pattern.

In another aspect of the present invention, an apparatus for controlling a transmission device of a vehicle includes an energy compensation determination unit for determining first energy consumption according to loads of operating devices in a vehicle and second energy consumption according to vehicle speed and road inclination during vehicle driving and applying the first and second energy consumption and a state of charge (SoC) of a battery to determine an energy compensation pattern, and a shift pattern determination unit for determining a basic shift pattern according to whether towing is performed and the road inclination and determining a last shift pattern so as to correspond to the basic shift pattern and the energy compensation pattern.

The apparatus may further include a towing checking unit for checking whether the towing is performed, a grade determination unit for determining the road inclination, and a shift pattern storage for storing a plurality of shift patterns to be selected as the last shift pattern.

The shift pattern determination unit may receive information on whether the towing is performed and weight change of the vehicle due to the towing, compare the weight change of the vehicle with a threshold value, and determine the basic shift pattern according to a comparison result.

The information on whether the towing is performed and the weight change may be continuously calculated through an engine output and an output value of an acceleration sensor during driving and may be transmitted to the shift pattern determination unit, and when the calculated weight change is equal to or greater than a preset threshold range, the shift pattern determination unit may adjust the basic shift pattern.

The threshold value may include at least two different reference values, and the number of basic shift patterns may be greater than the number of the threshold values by one.

The shift pattern determination unit may determine at least one of first shift patterns according to the road inclination (grade) as the basic shift pattern so as to correspond to a weight parameter according to whether the towing is performed or determines at least one of second shift patterns as the basic shift pattern so as to correspond to the road inclination (grade) and a weight parameter.

The first shift patterns and the second shift patterns may include different shift patterns.

A first threshold value to be compared with the road inclination (grade) and a second threshold value to be compared with the road inclination (grade) and the weight parameter may be different.

The first shift patterns and the second shift patterns may include the same shift pattern, and the first threshold value to be compared with the road inclination (grade) and the second threshold value to be compared with the road inclination (grade) and the weight parameter may be the same.

The energy compensation determination unit may recognize an amplitude of the vehicle, calculate whether an electronic device including an air conditioning system and an audio-video-navigation system installed in the vehicle is used and power consumption of the electronic device, determine operating load based on user operating preference information according to driving environment information and, then, determine the first energy consumption so as to correspond to the amplitude, whether the electronic device is used, power consumption of the electronic device, and the operating load.

The energy compensation determination unit may determine operating load based on the vehicle speed and the road inclination and determine the second energy consumption according to the operating load.

The shift pattern determination unit may add the first energy consumption to a low power state entrance threshold value to determine a first parameter, add the second energy consumption to the low power state entrance threshold value to determine a second parameter, determine an SoC of a battery installed in the vehicle as a third parameter and, then, compare the first parameter, the second parameter, and the third parameter to determine the energy compensation pattern.

When the third parameter is greater than the first parameter and the second parameter, the energy compensation pattern may be determined to maximize fuel efficiency or energy efficiency, when the third parameter is smaller than the first parameter or the second parameter, the energy compensation pattern may be determined to reduced fuel consumption or energy consumption, and the energy compensation pattern when the third parameter is smaller than the second parameter may have smaller fuel consumption or energy consumption than the energy compensation pattern when the third parameter is smaller than the first parameter.

It is to be understood that both the foregoing general description and the following detailed description of embodiments are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

Figure 1:
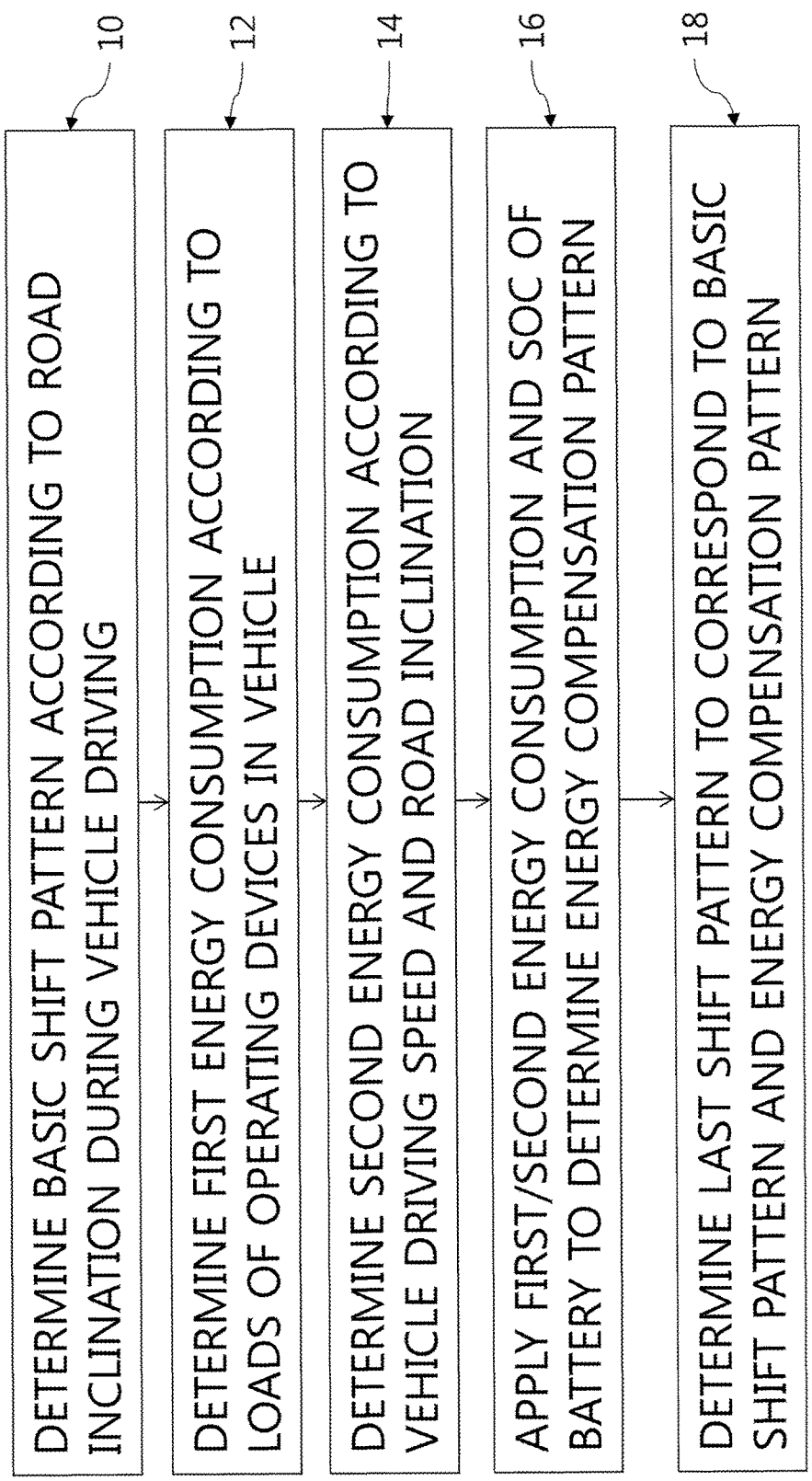
FIG. 1 is a diagram for explanation of a first method of controlling a transmission of a vehicle.

Reference will now be made in detail to the embodiments of the present invention, examples of which are illustrated in the accompanying drawings. In addition, the suffixes "module" and "unit" of elements herein are used for convenience of description and thus can be used interchangeably and do not have any distinguishable meanings or functions.

It will be understood that when an element is referred to as being "on (above)" or "under (below)" another element, it can be directly on or under the element, and one or more intervening elements may also be present. In addition, when an element is referred to as being "on (above)" or "under (below)", this may be interpreted as a downward direction as well as an upward direction.

It will be understood that, although the terms first, second, A, B, (a), (b), etc. may be used herein to describe various elements, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

Hybrid vehicles or electric vehicles are driven using a motor instead of an engine and a high-voltage battery instead of fuel unlike a typical internal combustion engine and, in this regard, effective control of a transmission facilitates effective consumption of electric energy stored in a battery.

When a weight of a vehicle is increased, the amount of energy consumed to move a vehicle is changed and, thus, control of a transmission needs to be changed. For example, in the case of towing a vehicle coupled to another vehicle, the weight of the vehicle is remarkably increased due to the coupled vehicle. In this case, when increase in vehicle weight is not applied to shift control, fuel efficiency of the vehicle is remarkably degraded. In the same environment, a state of charge (SoC) of a battery is remarkably degraded in the case of a hybrid vehicle or an electric vehicle.

An automatic transmission is a device for automatically manipulating a clutch and a transmission by a mechanical and electronic device instead of a driver or a user and automatically changing power generated by an engine or electric energy supplied from a battery into rotational speed and rotational power for driving a wheel. The automatic transmission may be closely related to energy efficiency of a vehicle and may determine a shift pattern of a vehicle according to a vehicle driving state (e.g., road condition and driving environment) to enhance safety, speed, and ride comfort during vehicle driving. In addition, a transmission installed in a vehicle may be operated using a learning control method of automatically selecting an optimum gear shift stage according to preference, habit, and taste of a driver or a user in order to satisfy various characteristics of drivers or users.

A computing device installed in a vehicle may store an optimum shift pattern according to various driving environments. The computing device may recognize a vehicle driving state through open/close of a throttle valve, vehicle speed, engine rotation, revolutions of output of automatic transmission (AT), engine torque, transfer shaft torque, controlled oil pressure, oil temperature, a shift lever position, acceleration, a brake manipulation signal, and so on.

Shift control may be performed according to vehicle speed, inclination (grade) of a driving road, and a state of charge (SoC) of a battery installed in a vehicle. For example, a shift pattern used in a transmission may be used when an SoC of a battery is lower than a preset reference or may be determined according to SoC balancing for maintaining an SoC and an optimal operating line (OOL) for high engine efficiency in order to maximize performance of a battery installed in the vehicle.

FIG. 1 is a diagram for explanation of a first method of controlling a transmission of a vehicle.

As illustrated in the drawing, the first method of controlling the transmission of the vehicle may include determining (10) a basic shift pattern according to road inclination during vehicle driving, determining (12) first energy consumption according to loads of operating devices in the vehicle, determining (14) second energy consumption according to vehicle speed and road inclination, determining (16) an energy compensation pattern through comparison between the first and second energy consumption and the SoC of the battery, and determining (18) a last shift pattern according to a basic shift pattern and energy compensation pattern.

In order to control a transmission of a vehicle, inclination (grade) of a road on which a vehicle drives may be detected and a shift pattern may be determined according to the road inclination. Road inclination greatly affects fuel efficiency and, thus, a shift pattern may be determined according to road inclination so as to enhance fuel efficiency.

A hybrid vehicle uses two or more power sources (an engine and a motor) and uses an electric energy storage system such as a battery (or an ultra capacitor). Accordingly, with regard to control of a hybrid vehicle for enhancing fuel efficiency, it may be important to turn off an engine if possible and operate an engine in a region with high efficiency while maximizing motor driving during vehicle driving. Accordingly, in order to determine a shift pattern, it may be necessary to consider an SoC of a battery installed in a vehicle. During driving of a hybrid vehicle, a power source and electric energy may not be used only for vehicle driving. A user or a driver may use various electronic devices installed in a vehicle during vehicle driving and the electronic devices consume electric energy. Accordingly, in order to enhance fuel efficiency, it may be necessary to determine first energy consumption according to loads of devices (e.g., an air conditioner and a multimedia device) that are installed in the vehicle and operated during driving.

For driving of a hybrid vehicle, a motor using electric energy may be used as an auxiliary power source. In order to enhance fuel efficiency using a motor as an auxiliary power source, it may be necessary to consider an SoC of a battery installed in a vehicle, which largely affects a frequency of use (e.g., time and power consumption) of a motor. For example, when a hybrid vehicle drives a congested city street, the frequency of use of the motor may be high for enhancing fuel efficiency. In this case, a battery installed in a vehicle is rapidly discharged and, thus, there is a need to select a shift pattern for as high SoC of the battery as possible during driving on a city street.

In order to determine a shift pattern corresponding to an SoC of a battery, the first energy consumption and second energy consumption need to be compared with the SoC of the battery. For example, a plurality of reference values of the SoC of the battery installed in the vehicle may be set. In detail, a first low power state of charge SoC LOW LV1 and second low power state of charge SoC LOW LV2 with different levels may be set. The computing device installed in the vehicle may calculate load according to a current altitude of a driving vehicle, whether an air conditioning (cooling and heating) device is used, whether an electronic device is used, and so on and then compare the calculated altitude with a preset value according to a driver or user tendency to determine whether a driving vehicle is capable of entering the first low power state of charge SoC LOW LV1. When the computing device installed in the vehicle determines that an SoC of a battery is capable of entering the first low power state of charge SoC LOW LV1 during driving, a transmission may control vehicle driving according to a shift pattern corresponding to the first low power state of charge SoC LOW LV1. As such, when the computing device installed in the vehicle determines that the SoC of the battery is capable of entering the second low power state of charge SoC LOW LV2 during driving, the transmission may control vehicle driving according to a shift pattern corresponding to the second low power state of charge SoC LOW LV2.

A threshold value (e.g., SoC LOW LV1 and SoC LOW LV2) that the SoC of the battery installed in the vehicle is capable of entering may be set and different shift patterns corresponding to corresponding conditions may be applied to enhance fuel efficiency. In the first low power state of charge SoC LOW LV1, an SoC of a battery, an offset value of which is set according to a current altitude, cooling and heating requirement, and loads of other electric components, and a user tendency, may be calculated in the same way as general control. Then, when the calculated SoC of the battery and a current SoC of the battery are compared with each other the current SoC of the battery is lower than the set SoC of the battery, a shift pattern corresponding to the first low power state of charge SoC LOW LV1 may be selected and a vehicle transmission may be controlled.

In the second low power state of charge SoC LOW LV2, an SoC offset value may be determined for each vehicle speed and inclination under an existing driving condition and may be added to a low power SoC entrance level and, then, the resulting value and the current SoC of the battery may be compared to determine whether the current SoC enters a shift pattern corresponding to the second low power state of charge SoC LOW LV2. For example, when the SoC of the battery enters the second low power state of charge SoC LOW LV2 at high speed and low inclination and the transmission is controlled, the SoC of the battery may be balanced. In addition, in order to prevent a case in which fuel consumption is increased using maximum engine torque and a motor is assisted due to battery discharge at high speed and low inclination, high load driving may be performed via only an engine and driving may be performed using non-discharged energy as electric energy in a region with high system efficiency while guiding a transmission to a low gear step. The control method may facilitate effective use of a hybrid system.

In some embodiments, in a general situation in which electric energy is capable of being used because a high current SoC of a battery is maintained and is far from a low power state, road inclination may be recognized by a gravity sensor (G-sensor) without consideration of load according to a driving condition and may differentiate a shift pattern for each inclination level.

In a first method of controlling a vehicle transmission, when towing is considered in a hybrid vehicle and a plug-in hybrid vehicle, a weight of the vehicle is increased and, accordingly, a shift pattern may be differently set and it is difficult to obtain an effective fuel efficiency gain.

Figure 2:
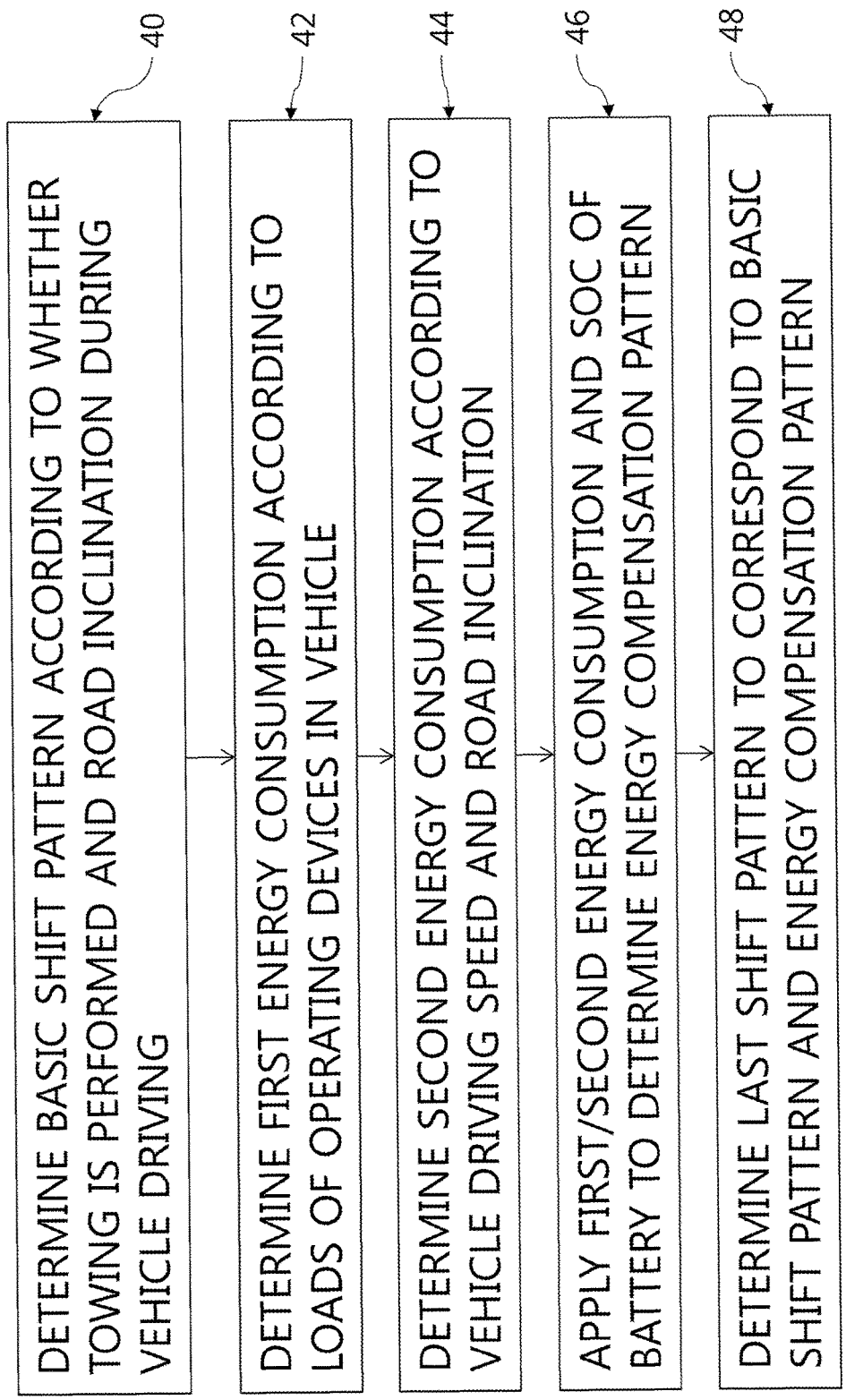
FIG. 2 is a diagram for explanation of a second method of controlling a transmission of a vehicle.

FIG. 2 is a diagram for explanation of a second method of controlling a transmission of a vehicle.

As illustrated in the drawing, the second method of controlling the transmission of the vehicle may include determining (40) a basic shift pattern according to whether towing is performed and road inclination during vehicle driving, determining (42) first energy consumption according to devices that are operated in the vehicle, determining (44) second energy consumption according to vehicle speed and road inclination, comparing (46) the first and second energy consumptions with an SoC of a battery to determine an energy compensation pattern, and determining (48) a last shift pattern so as to correspond to a basic shift pattern and energy compensation pattern.

In the second method of controlling the transmission of the vehicle, whether towing is performed and, then, a shift pattern for effective fuel efficiency may be determined by applying an overall increased vehicle weight due to towing. When whether towing is performed and change in vehicle weight due to towing are not applied to determine the shift pattern, an existing shift pattern strategy may be used without change and, in this case, a user or a driver may determine that acceleration power is insufficient compared with an existing vehicle due to excessive increase in vehicle weight and may excessively depress an accelerator pedal. Excessive accelerator pedal manipulation of the user or the driver may be detected by an accelerator position sensor (APS) and, in this case, motor assistance may be performed in most driving regions and, thus, it may be difficult to balance an SoC of the battery. When the SoC of the battery is not capable of being appropriately balanced, the vehicle may not be driven and fuel efficiency may be degraded in a region with high engine efficiency. In addition, when the SoC of the battery is excessively lowered, if a hybrid system is initially driven by a motor, the vehicle may not be accelerated due to a low SoC of the battery.

When a user or a driver excessively depresses an accelerator pedal according to change in vehicle weight due to towing, busy shift of repeatedly performing various shift processes such as kick down, lift foot up (LFU), and lock up may occur according to a detection result of the APS.

Influence of change in vehicle weight due to towing on vehicle driving may be substantially the same as influence of inclination (grade) of a road on which a vehicle drives. The change in vehicle weight due to towing may be continuously, periodically, or aperiodically detected during driving using an acceleration sensor and wheel torque that is lastly transferred to a wheel. Accordingly, when vehicle weight is changed due to towing according to the detection result, a shift pattern may be differently set according to the change in vehicle detection as well as road inclination (grade), detected by the G-sensor.

In embodiments, the determining (42) of the first energy consumption may include recognizing a vehicle amplitude, determining whether an electric component including an audio-video-navigation system and an air conditioning system installed in a vehicle is used and calculating power consumption of the electronic component, determining operating load based on user driving tendency information according to driving environment information, and determining the first energy consumption according to an amplitude, whether an electric component is used, power consumption of the electronic component, and operating load. The determining (44) of the second energy consumption may include determining operating load based on vehicle speed and road inclination and determining second energy consumption according to operating load.

Here, the first energy consumption may be used to determine a shift pattern by applying a used amount of electric energy stored in a battery installed in a vehicle based on factors to be periodically or discontinuously recognized and detected during driving of a hybrid vehicle and the second energy consumption may be used to determine a shift pattern by applying a used amount of electric energy used in a motor that boosts engine output based on factors that are continuously recognized and detected during driving of the hybrid vehicle.

Figure 3:
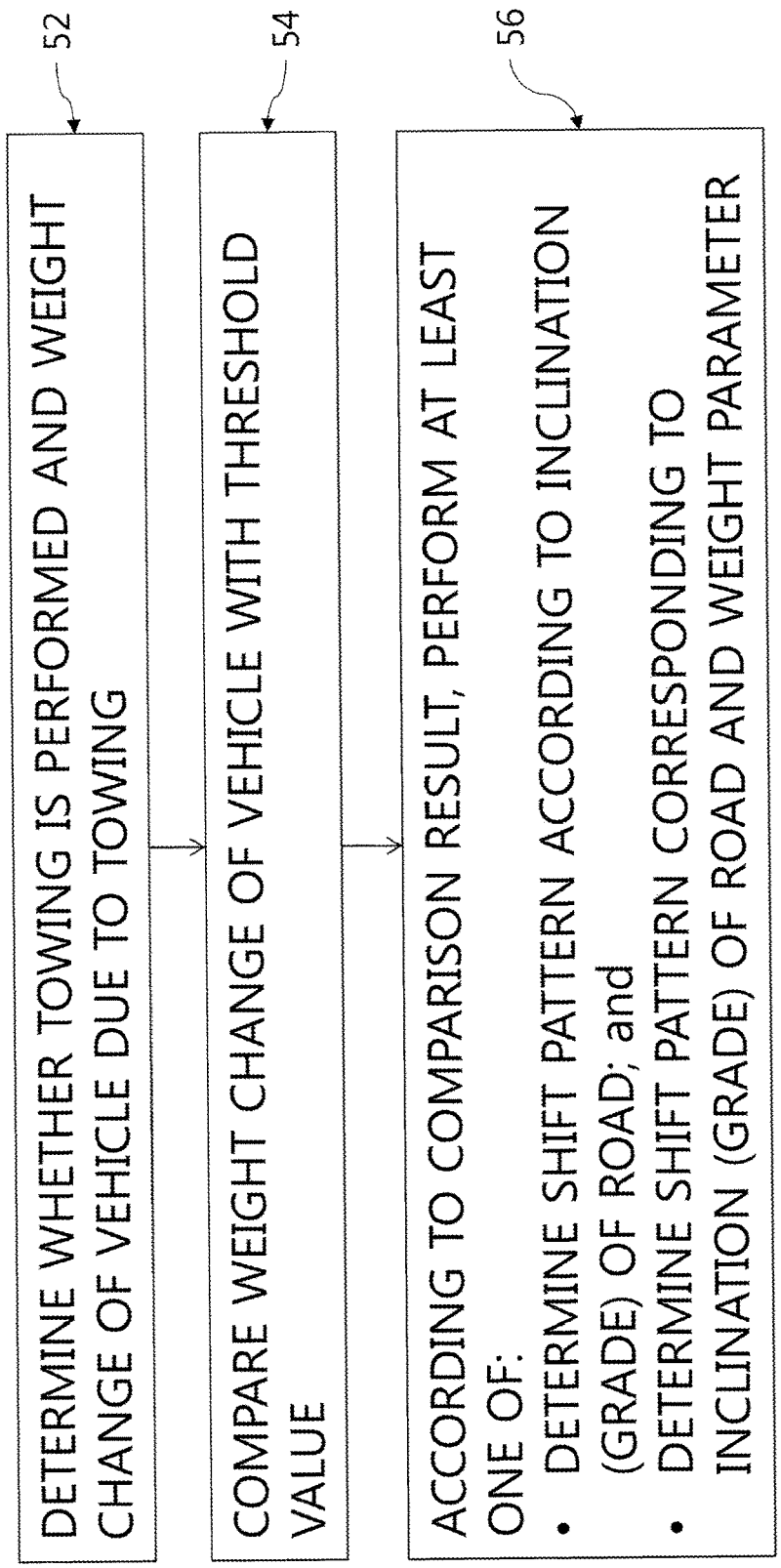
FIG. 3 is a diagram for explanation of a method of determining a basic shift pattern according to whether towing is performed and road inclination during vehicle driving.

FIG. 3 is a diagram for explanation of a method of determining a basic shift pattern according to whether towing is performed and road inclination during vehicle driving.

As illustrated in the drawing, the method of determining a basic shift pattern according to whether towing is performed and road inclination during vehicle driving may further include determining (52) whether towing is performed and change in vehicle weight due to towing, comparing (54) the change in vehicle weight with a threshold value and determining (56) the basic shift pattern according to the comparison result. Here, in the determining (56) of the basic shift pattern according to the comparison result, determining at least one of first shift patterns as the basic shift pattern according to road inclination (grade) and determining at least one of second shift patterns as the basic shift pattern according to road inclination (grade) and a weight parameter may be performed. Here, the weight parameter may refer to a value obtained by converting a range of change in vehicle weight into a value such as road inclination (grade).

For example, a threshold value as a comparison target used to determine a shift pattern according to change in vehicle weight may include at least two different reference values. As a shift pattern is more subdivided according to a range of change in vehicle weight, higher fuel efficiency may be obtained. The number of basic shift patterns that are preset in a vehicle may be greater than the number of threshold values by one. That is, when the number of threshold values is 2, the number of preset basic shift patterns may be three.

Influence of change in vehicle weight due to towing on vehicle driving may be substantially the same as influence of inclination (grade) of a road on which a vehicle drives and, thus, operating load of the vehicle may be similar to additional adjusted road inclination (grade) using the weight parameter according to change in vehicle weight. Accordingly, the first shift patterns corresponding to road inclination (grade) and the second shift patterns corresponding to road inclination (grade) and the weight parameter may be set to be partially overlapping patterns.

In some embodiments, a shift pattern corresponding to change in vehicle weight and a shift pattern corresponding to road inclination (grade) may be differently set. In this case, a first threshold value to be compared with road inclination (grade) and a second threshold value to be compared with road inclination (grade) and the weight parameter may be different.

Figure 4:
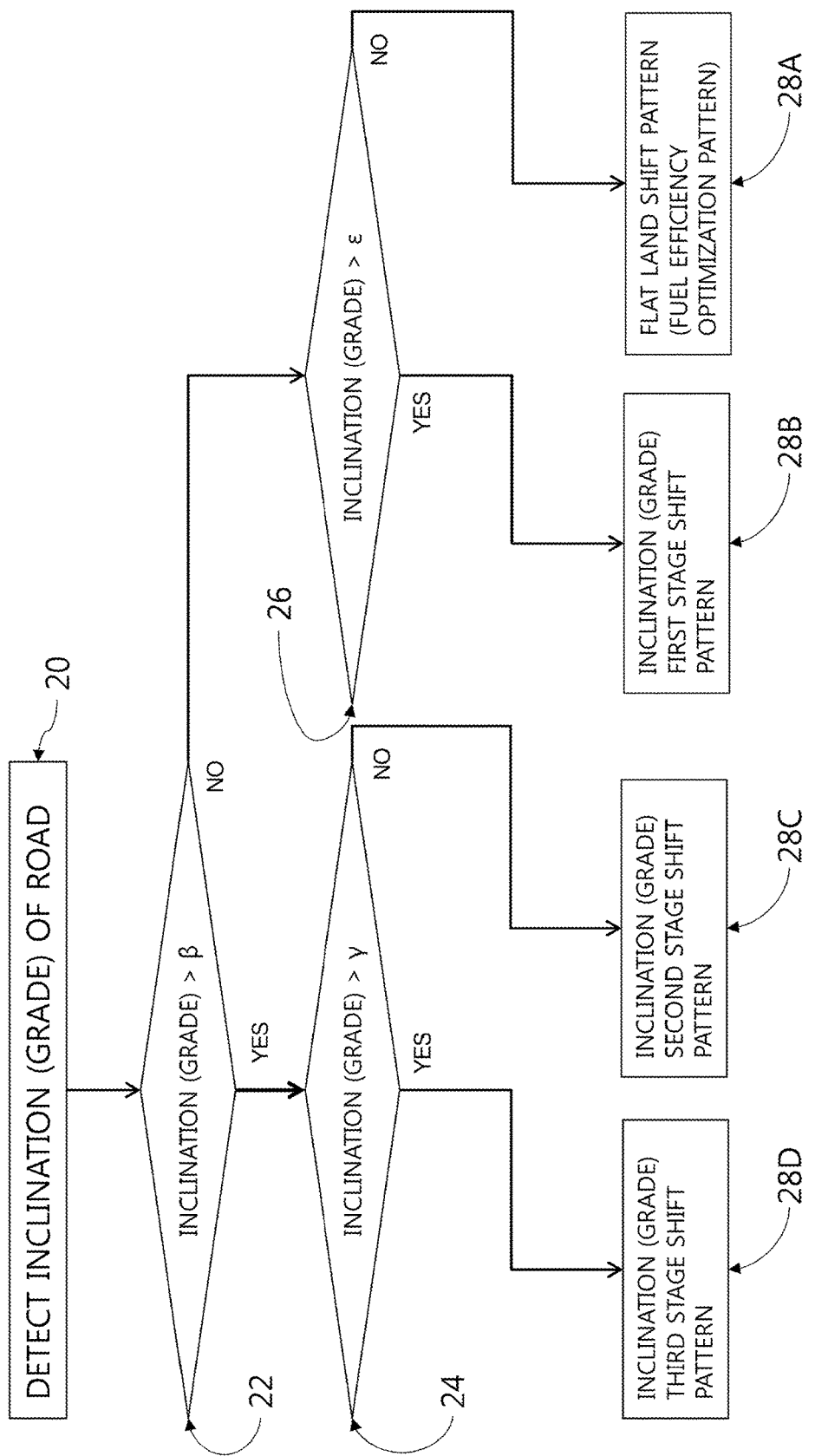
FIG. 4 is a diagram for explanation of a method of determining a shift pattern according to road inclination (grade)

FIG. 4 is a diagram for explanation of a method of determining a shift pattern according to road inclination (grade). When influence of change in vehicle weight due to towing on vehicle driving is low (e.g., when change in weight is within a preset range), the hybrid vehicle may determine a shift pattern according to road inclination (grade).

As illustrated in the drawing, the method of determining a shift pattern according to road inclination (grade) may include detecting (20) road inclination (grade) using a G-sensor or the like, comparing (22) the road inclination with a first threshold value $\beta$, comparing (24) the road inclination with a second threshold value $\gamma$ when the road inclination is greater than the first threshold value $\beta$, comparing (26) the road inclination with a third threshold value $\epsilon$ when the road inclination is less than the first threshold value $\beta$, and determining (28A to 28D) one of four shift patterns according to the comparison result between the second threshold value $\gamma$ and the third threshold value $\epsilon$. Here, the first threshold value $\beta$ may be less than the second threshold value $\gamma$ and greater than the third threshold value $\epsilon$.

For example, when the road inclination (grade) is lower than the third threshold value $\epsilon$, influence of the road inclination (grade) on vehicle operating load may be determined to be low and a shift pattern (that is, pattern for optimizing fuel efficiency, 28A) on flat land without inclination may be selected. When the road inclination (grade) is increased and belongs to a range divided via the first threshold value $\beta$, and second threshold value $\gamma$, and the third threshold value $\epsilon$, the vehicle may select a shift pattern to which influence of road inclination (grade) on operating load is applied.

Figure 5:
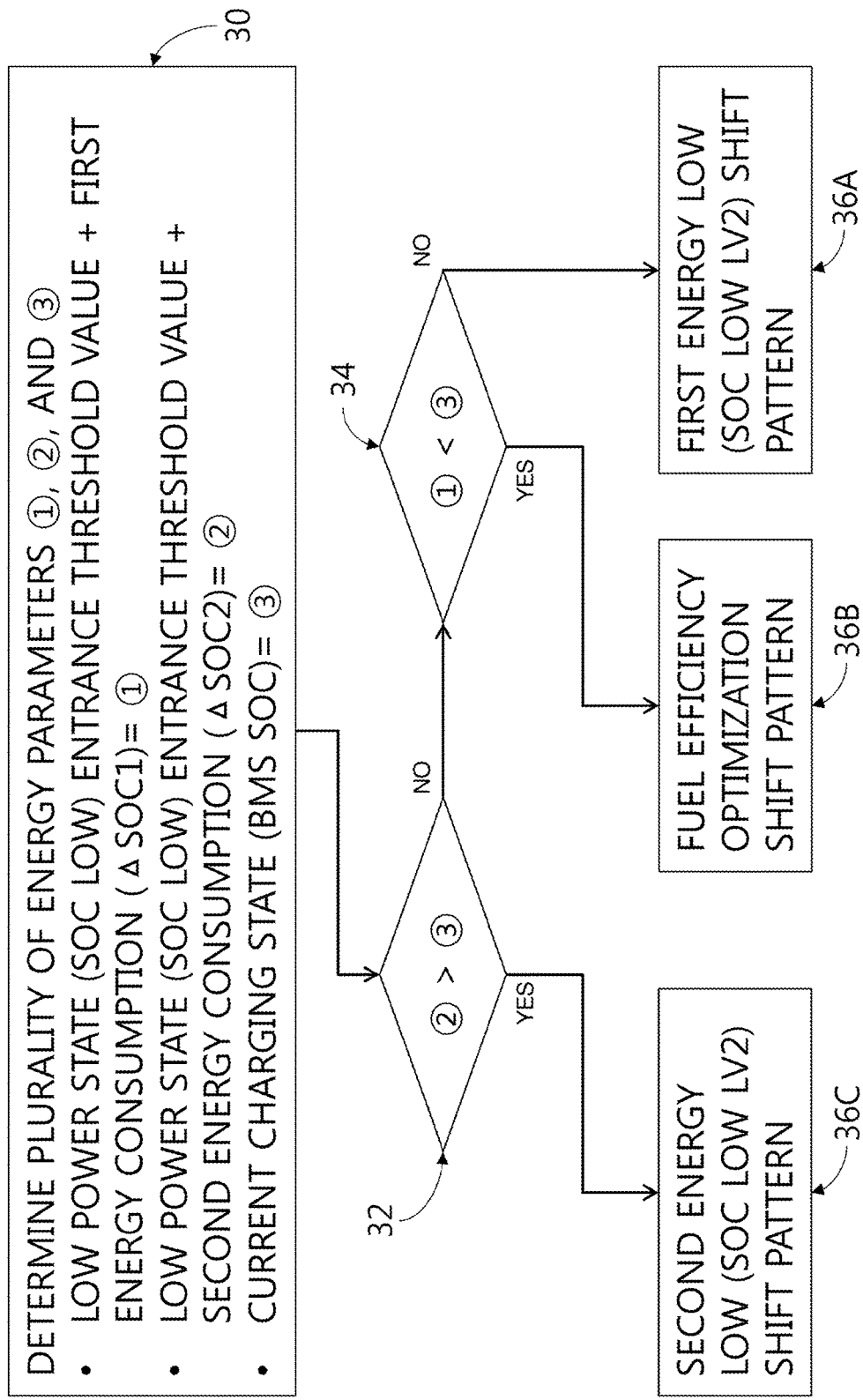
FIG. 5 is a diagram for explanation of a method of determining a shift pattern based on a charging state and energy consumption of a vehicle.

FIG. 5 is a diagram for explanation of a method of determining a shift pattern based on a charging state and energy consumption of a vehicle.

As illustrated in the drawing, the method of determining a shift pattern based on a charging state and energy consumption of a vehicle may include determining (30) a plurality of energy parameters (i.e., a first parameter ①, a second parameter ②, and a third parameter ∆. In more detail, the method of determining a shift pattern based on a charging state and energy consumption of a vehicle may include determining the first parameter ① by adding first energy consumption SoC1 to a low power state entrance threshold value, determining the second parameter ② by adding second energy consumption SoC2 to the low power state entrance threshold value, and determining a current charging state BMS SoC of a battery installed in a vehicle as the third parameter ③.

Then, the method of determining a shift pattern based on a charging state and energy consumption of a vehicle may include comparing the first parameter ①, the second parameter ②, and the third parameter ③ to determine the energy compensation pattern. In detail, whether the third parameter ③ is less than the second parameter ② may be determined (32). When the third parameter ③ is less than the second parameter ②, a hybrid vehicle may select a shift pattern corresponding to the second low power state of charge SoC LOW LV2 (36C). Here, the shift pattern corresponding to the second low power state of charge SoC LOW LV2 may be a detailed shift pattern to which a degree of using electric energy of a driving vehicle is further applied based on a basic shift pattern that is determined according to whether towing is performed, change in vehicle weight, and inclination (grade) of a driving road.

However, when the third parameter ③ is greater than the second parameter ②, it may be determined that the third parameter ③ is greater than the first parameter ① (34). Similarly, when the third parameter ③ is greater than the second parameter ② and less than the first parameter ①, the hybrid vehicle may select a shift pattern corresponding to the first low power state of charge SoC LOW LV1 (36A).

When the third parameter ③ is greater than the first parameter ①, the hybrid vehicle may select a shift pattern for optimization of fuel efficiency (36B). This is a condition corresponding to low possibility that an SoC of a battery installed in a vehicle enters a low power state due to consumption of electric energy during vehicle driving and, thus, consumption of electric energy during vehicle driving may not affect a shift pattern of the vehicle. In this case, separate additional modification and manipulation need not be applied to the basic shift pattern that is determined according to whether towing is performed, change in vehicle weight, and inclination (grade) of a driving road.

Figure 6:
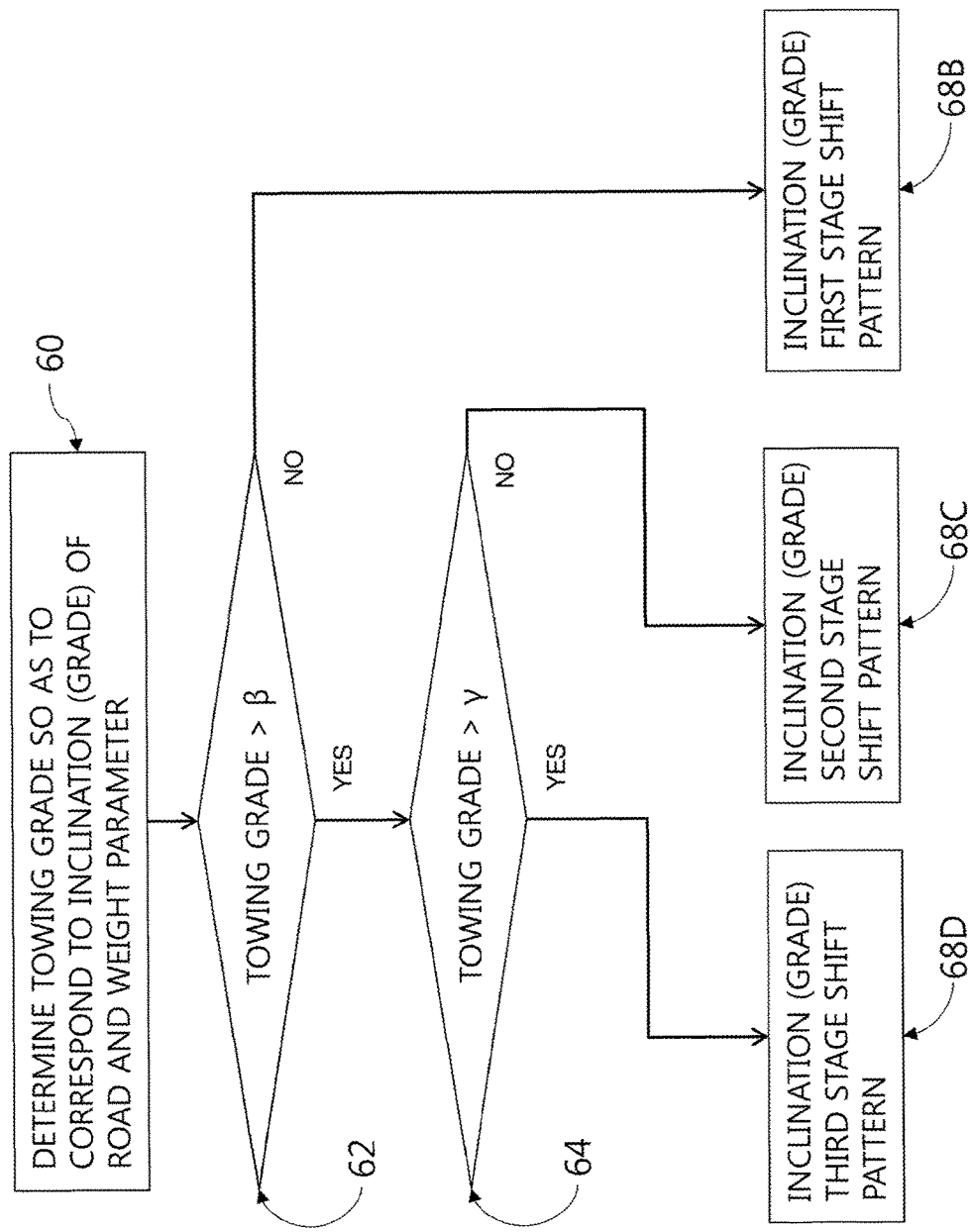
FIG. 6 is a diagram for a method of determining a shift pattern according to a towing grade.

FIG. 6 is a diagram for a method of determining a shift pattern according to a towing grade. When change in vehicle weight due to towing largely affects vehicle driving (e.g., when change in vehicle weight exceeds a preset range), the hybrid vehicle may determine a shift pattern according to a road inclination (grade) and a weight parameter.

As illustrated in the drawing, the method of determining a shift pattern according to a towing grade may include determining (60) a towing grade according to a road inclination (grade) and a weight parameter, comparing (62) the towing grade and the first threshold value β, comparing (64) the towing grade with the second threshold value γ when the towing grade is greater than the first threshold value β, and determining (68B to 68D) one of three shift patterns according to the comparison result between the first threshold value β and the second threshold value γ. Here, the three shift patterns may include second and fourth shift patterns among the four shift patterns described with reference to FIG. 4. This is one embodiment that is designed on the assumption that change in vehicle weight due to towing enhances a range of a road inclination (grade) by one step.

In some embodiments, a relationship between change in vehicle weight and a road inclination (grade) may be differently set, ranges of a towing grade and a road inclination (grade) may be differently set, and a threshold value as a comparison target and a selectable shift pattern may be differently set.

Referring to FIGS. 2 to 6, a grade of an actual road may be copied as a grade recognized via a G-sensor or the like and a fuel efficiency optimization pattern and a grade level may be divided into a plurality of levels (e.g., Level 1/2/3) and controlled according to an SoC of a battery. For example, when the SoC of the battery is lowered, even if a fuel efficiency optimization pattern is selected during driving on flat land, a pattern, for maintaining the SoC of the battery at a predetermined level, may be determined under various conditions and a plurality of detailed levels (e.g., the first low power state of charge SoC LOW LV1 and the second low power state of charge SoC LOW LV2) may be applied.

When whether towing is performed is detected, a shift pattern may be determined according to a vehicle weight that is increased according to towing. For example, in the case of towing that causes weight change that is equal to or less than a predetermined weight α, a shift pattern determined in consideration of balance between current fuel efficiency and a battery SoC and a shift pattern to be applied to an actual road grade may be used and, in the case of towing that causes weight change that is greater than or equal to the predetermined weight α, a towing grade with respect to an actual vehicle load may be calculated using change in driving resistance calculated using a wheel torque and a basic vehicle weight after entrance into a shift pattern for towing in order to pre-determine weight increment and driver acceleration intention. Then, the calculated towing grade and an existing used grade level may be compared and a shift pattern may be applied. In addition, a shift pattern, which is originally used only in the case of a high actual road grade, may also be applied at a flat land according to a weight increment and driver acceleration intention, and even if an actual road grade is increased, the shift pattern may be changed and applied in the same way.

Figure 7:
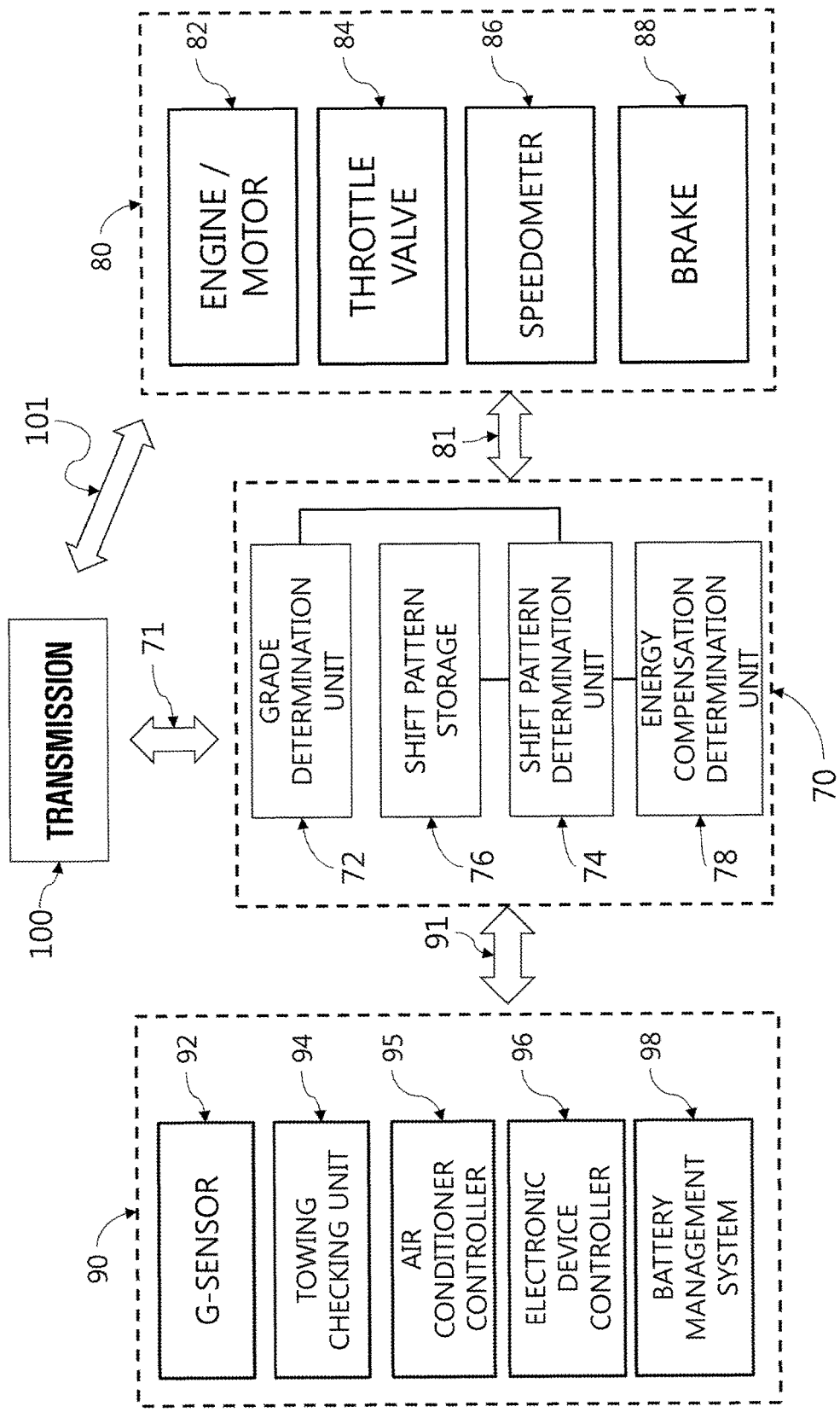
FIG. 7 is a diagram for explanation of an apparatus for controlling a transmission of a hybrid vehicle.

FIG. 7 is a diagram for explanation of an apparatus for controlling a transmission of a hybrid vehicle.

As illustrated in the drawing, a hybrid vehicle may include a transmission 100, a shift control device 70, an operating device 80, an electronic device 90, and so on. The shift control device 70 may determine a shift pattern for enhancing fuel efficiency in consideration of operating load, operating load, and so on and transmit a control signal 71 according to the determined pattern to the transmission 100. The transmission 100 may convert power transferred from an engine and motor 82 into rotational power.

The operating device 80 may include a throttle valve 84, a speedometer 86, a brake 88, and so on. The electronic device 90 may include a G-sensor 92, a towing checking unit 94 for detecting and recognizing whether vehicle towing is performed, an air conditioner controller 95 for controlling an operation of an air conditioner in a vehicle, an electronic device controller 96 for controlling various electronic devices installed in a vehicle, a battery manager 98 for managing an SoC of a battery installed in a vehicle, and so on.

In detail, the shift control device 70 may include an energy compensation determination unit 78 for determining first energy consumption according to loads of devices that operate in a vehicle and second energy consumption according to vehicle speed and road inclination during vehicle driving and determining an energy compensation pattern by applying the first and second energy consumptions and an SoC of a battery, and a shift pattern determination unit 74 for determining a basic shift pattern according to whether towing is performed and road inclination and determining a last shift pattern according to a basic shift pattern and the energy compensation pattern.

The shift control device 70 may further include a grade determination unit 72 for determining road inclination (grade) in conjunction with the G-sensor 92 and a shift pattern storage 76 for storing a plurality of shift patterns to be selected as a last shift pattern. The shift control device 70 may be operatively associated with the towing checking unit 94 for checking whether towing is performed.

The shift pattern determination unit 74 may receive information on whether towing is performed and change in vehicle weight, compare the change in vehicle weight with a threshold value, and determine the basic shift pattern according to the comparison result. Here, the shift pattern determination unit 74 may receive the information on whether towing is performed through the towing checking unit 94, may calculate change in vehicle weight due to towing using a wheel torque and a value transmitted from an acceleration sensor, and may continuously calculate change in vehicle weight during vehicle driving. When the calculated changed in vehicle weight is greater than or equal to a preset threshold range, the shift pattern determination unit 74 may adjust the basic shift pattern.

A threshold value used for comparison by the shift pattern determination unit 74 may include at least two different reference values and the number of basic shift patterns may be greater than the number of threshold values by one. This may be changed in some embodiments and more effective fuel efficiency may be achieved as a vehicle uses a greater number of threshold values and a greater number of shift patterns.

According to a weight parameter based on whether towing is performed, the shift pattern determination unit 74 may determine one of first shift patterns according to road inclination (grade) or, according to the road inclination (grade) and the weight parameter, the shift pattern determination unit 74 may determine one of second shift patterns as the basic shift pattern. Here, the first shift patterns and the second shift patterns may include different shift patterns and a first threshold value to be compared with road inclination (grade) and a second threshold value to be compared with a weight parameter may be different.

In some embodiments, the first shift patterns and the second shift patterns may include the same shift pattern and the first threshold value to be compared with road inclination (grade) and the second threshold value to be compared with a weight parameter may be the same.

The energy compensation determination unit 78 may recognize a vehicle amplitude, calculate whether an electronic device including an audio-video-navigation system and an air conditioning system installed in a vehicle is used and power consumption of the electronic device, determine operating load based on user operating preference information according to driving environment information and, then determine the first energy consumption according to an amplitude, whether an electronic device is used, power consumption of the electronic device, and operating load. In addition, the energy compensation determination unit 78 may determine operating load based on vehicle speed and road inclination and determine the second energy consumption according to operating load. Here, the first energy consumption may be used to determine a shift pattern by applying a used amount of electric energy stored in a battery installed in a vehicle based on factors that are periodically or discontinuously recognized and detected during driving of a hybrid vehicle. The second energy consumption may be used to determine a shift pattern by applying a used amount of electric energy used in a motor that facilitates output of an engine based on factors that are continuously recognized and detected during driving of a hybrid vehicle.

The hybrid vehicle may apply a used amount of electric energy during driving to a basic shift pattern determined according to road inclination and a weight parameter to subdivide the shift pattern. The shift pattern determination unit 74 may add the first energy consumption to the low power state entrance threshold value to determine a first parameter, add the second energy consumption to the low power state entrance threshold value, and determine a current SoC of a battery installed in a vehicle as the third parameter.

The shift pattern determination unit 74 may compare the first parameter, the second parameter, and the third parameter to determine an energy compensation pattern. When the third parameter is greater than the first parameter and the second parameter, the energy compensation pattern may be determined to maximize fuel efficiency or energy efficiency. When the third parameter is less than the first parameter or the second parameter, the energy compensation pattern may be determined to reduce fuel consumption or energy consumption. The energy compensation pattern when the third parameter is less than the second parameter may have lower fuel consumption or energy consumption than the energy compensation pattern when the third parameter is less than the first parameter. Lastly, the shift pattern determination unit 74 may determine the last shift pattern by applying the energy compensation pattern to the basic shift pattern determined according to road inclination and a weight parameter.

According to the aforementioned embodiment, a method and apparatus for determining a shift pattern for differentiating the case in which a hybrid or plug-in hybrid vehicle performs towing and the case in which the vehicle does not perform towing has been described. When a shift pattern strategy in the case of towing is differentiated, an SoC of a battery of the hybrid and plug-in hybrid vehicle may be smoothly controlled so as to achieve gain of fuel efficiency even if a vehicle weight is changed due to towing. In addition, the vehicle may be controlled such that a driver does not experience busy shift in terms of operability according to whether towing is performed even if towing is performed.

In embodiments, a hybrid vehicle includes an electronic control unit for controlling an automatic transmission which transmits torque from an engine/a motor to wheels. The ECU includes a transmission control module which includes a memory or storage for storing a plurality of shift patterns P1, P2, P3, P4, P5, P6, P7 . . . Pn, each of which is different from the other. The transmission control module further includes one or more processors for determining one of the plurality of shift patterns using signals and/or information from sensors or other control modules.

Referring to FIGS. 1 and 3, the basic shift patterns in a non-towing state are determined from a first subset of shift patterns among the plurality of shift patterns. The first subset includes, for example, shift pattern P1 (for the flat land shift pattern 28A in FIG. 4), shift pattern P2 (for the first stage shift pattern 28B in FIG. 4), shift pattern P3 (for the second stage shift pattern 28C in FIG. 4) and shift pattern P4 (for the third stage shift pattern 28D in FIG. 4).

Referring to FIGS. 2 and 6, the basic shift patterns in a towing state are determined from a second subset of shift patterns among the plurality of shift patterns. In one embodiment, the second subset includes at least one shift pattern which is included in the first subset. The second subset includes, for example, shift pattern P3 (for the first stage shift pattern 68B in FIG. 6), shift pattern P4 (for the second stage shift pattern 68C in FIG. 6) and shift pattern P5 (for the third stage shift pattern 68D in FIG. 6) when the first subset includes shift patterns P1, P2, P3 and P4. In this example, the first stage shift pattern 68B in FIG. 6 is the same pattern as the second stage shift pattern 28C in FIG. 4, but not limited thereto.

In another embodiment, the second subset includes shift patterns which are not included in the first subset. The second subset includes, for example, shift pattern P6 (for the first stage shift pattern 68B in FIG. 6), shift pattern P7 (for the second stage shift pattern 68C in FIG. 6) and shift pattern P8 (for the third stage shift pattern 68D in FIG. 6) when the first subset includes shift patterns P1, P2, P3 and P4.

In embodiments, the first subset includes at least one shift pattern that is not included in the second subset. In the foregoing examples, shift patterns P1 and P2 are not included in the second subset.

Further referring to FIGS. 2 and 6, the basic shift patterns in a first towing state for towing a first towing load (or a first towing weight) are determined from the second subset of shift patterns among the plurality of shift patterns. In embodiments, the basic shift patterns in a second towing state for towing a second towing load (or a second towing weight) which is greater than the first towing load (or the first towing weight) are determined from a third subset of shift patterns among the plurality of shift patterns.

In one embodiment, the third subset includes at least one shift pattern which is included in both the first subset and the second subset. The third subset includes, for example, shift pattern P4 (for the first stage shift pattern 68B in FIG. 6), shift pattern P5 (for the second stage shift pattern 68C in FIG. 6) and shift pattern P6 (for the third stage shift pattern 68D in FIG. 6) when the first subset includes the shift patterns P1, P2, P3 and P4 and the second subset includes the shift patters P3, P4 and P5 as discussed above.

In another embodiment, the third subset includes shift patterns which are not included in the first and second subsets. The third subset includes, for example, shift pattern P8 (for the first stage shift pattern 68B in FIG. 6), pattern P9 (for the second stage shift pattern 68C in FIG. 6) and pattern P10 (for the third stage shift pattern 68D in FIG. 6) when the first subject includes shift patterns P1, P2, P3 and P4 and the second subset includes P3, P4 and P5. In embodiments, the first, second and third subsets do not include overlapping shift patterns.

In embodiments, after start of driving a vehicle and once determining that the vehicle is towing a load, the basic shift patterns are chosen from only a selected subset of the plurality of shift patterns until the vehicle stops. In embodiments, after start of driving a vehicle and once determining that the vehicle is towing a load, the basic shift patterns are chosen only from a selected subset of the plurality of shift patterns until the vehicle's engine stops.

In embodiments, while driving, the ECU determines an operating shift pattern (or last shift pattern) based on the determined basic shift pattern and the information of electricity consumption and SoC. Gear shifting of the vehicle is performed based on the determined operating shift pattern. The operating shift pattern is one of the plurality of shift patterns stored in the memory. In one embodiment, the operating shift pattern is different from any one of basic shift patterns. In another embodiment, the operating shift pattern is one of the basic shift patterns.

An apparatus according to embodiments of the present invention has the following advantages.

According to embodiments of the present invention, even if a hybrid vehicle and an electric vehicle perform towing, an SoC of a battery in a vehicle may be applied to control a transmission so as to improve energy efficiency of a vehicle and to prevent the SoC of a battery from being degraded to a preset level or less, thereby enhancing vehicle mobility.

In addition, according to embodiments of the present invention, a transmission may be controlled so as to obtain an effective gain of fuel efficiency and to also prevent a driver from experiencing busy shift.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

The invention can also be embodied as computer readable code stored on a computer readable recording medium. Examples of the computer readable recording medium include read-only memory (ROM), random-access memory (RAM), CD-ROMs, magnetic tapes, floppy disks, optical data storage devices, carrier waves (e.g., transmission via the Internet), etc.

The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

It will be apparent to those skilled in the art that various modifications and variations can be made in the present invention without departing from the spirit or scope of the inventions.

Thus, it is intended that the present invention cover the modifications and variations of this invention provided they come within the scope of the appended claims and their equivalents.

What is claimed is:

1. A method of controlling a transmission device in a vehicle, the method comprising:
   determining a basic shift pattern according to whether towing is performed and road inclination during vehicle driving;
   determining first energy consumption according to loads of operating devices in the vehicle;
   determining second energy consumption according vehicle speed and the road inclination;
   comparing the first and second energy consumptions and a state of charge (SoC) of a battery to determine an energy compensation pattern; and
   determining a last shift pattern so as to correspond to the basic shift pattern and the energy compensation pattern.

2. The method according to claim 1, wherein the determining of the basic shift pattern further comprises:
   determining weight change of the vehicle according to whether towing is performed and the towing;
   comparing the weight change of the vehicle and a threshold value; and
   determining the basic shift pattern according to a comparison result.

3. The method according to claim 2, wherein the determining of the basic shift pattern according to the comparison result comprises at least one of:
   determining at least one of a first shift patterns as the basic shift pattern according to the road inclination (grade); and
   determining at least one of a second shift patterns as the basic shift pattern so as to correspond to the road inclination (grade) and a weight parameter.

4. The method according to claim 3, wherein the determining of the shift pattern according to the road inclination (grade) comprises:
   comparing the road inclination with a first threshold value;
   comparing the road inclination with a second threshold value when the road inclination is greater than the first threshold value;
   comparing the road inclination with a third threshold value when the road inclination is greater than the first threshold value; and
   determining one of four shift patterns according to a comparison result of the second threshold value and the third threshold value, wherein the first threshold value is smaller than the second threshold value and is greater than the third threshold value.

5. The method according to claim 4, wherein the determining of the basic shift pattern so as to correspond to the road inclination (grade) and a weight parameter comprises:
determining a towing grade corresponding to the road inclination (grade) and the weight parameter;
comparing the towing grade and the first threshold value;
comparing the towing grade with the second threshold value when towing grade is greater than the first threshold value; and
determining one of three shift patterns according to a comparison result of the first threshold value and the second threshold value.

6. The method according to claim 1, wherein the determining of the first energy consumption comprises:
recognizing an amplitude of the vehicle;
calculating whether an electronic device comprising an air conditioning system and an audio-video-navigation system installed in the vehicle is used and power consumption of the electronic device;
determining operating load based on user operating preference information according to driving environment information; and
determining the first energy consumption so as to correspond to the amplitude, whether the electronic device is used, power consumption of the electronic device, and the operating load.

7. The method according to claim 1, wherein the determining of the energy compensation pattern comprises:
adding the first energy consumption to a low power state entrance threshold value to determine a first parameter;
adding the second energy consumption to the low power state entrance threshold value to determine a second parameter;
determining a current SoC of a battery installed in the vehicle as a third parameter; and
comparing the first parameter, the second parameter, and the third parameter to determine the energy compensation pattern.

8. An apparatus for controlling a transmission device of a vehicle, the apparatus comprising:
an energy compensation determination unit configured to determine first energy consumption according to loads of operating devices in a vehicle and second energy consumption according to vehicle speed and road inclination during vehicle driving and applying the first and second energy consumption and a state of charge (SoC) of a battery to determine an energy compensation pattern; and
a shift pattern determination unit configured to determine a basic shift pattern according to whether towing is performed and the road inclination and determining a last shift pattern so as to correspond to the basic shift pattern and the energy compensation pattern.

9. The apparatus according to claim 8, further comprising:
a towing checking unit configured to check whether the towing is performed;
a grade determination unit configured to determine the road inclination; and
a shift pattern storage configured to store a plurality of shift patterns to be selected as the last shift pattern.

10. The apparatus according to claim 8, wherein the shift pattern determination unit is configured to receive information on whether the towing is performed and weight change of the vehicle due to the towing, compare the weight change of the vehicle with a threshold value, and determine the basic shift pattern according to a comparison result.

11. The apparatus according to claim 10, further comprising one or more processors configured such that the information on whether the towing is performed and the weight change are continuously calculated through an engine output and an output value of an acceleration sensor during driving and are transmitted to the shift pattern determination unit; and
wherein when the calculated weight change is equal to or greater than a preset threshold range, the shift pattern determination unit configured to adjust the basic shift pattern.

12. The apparatus according to claim 10, wherein:
the threshold value comprises at least two different reference values; and
the number of basic shift patterns is greater than the number of the threshold values by one.

13. The apparatus according to claim 10, wherein the shift pattern determination unit is configured to determine at least one of first shift patterns according to the road inclination (grade) as the basic shift pattern so as to correspond to a weight parameter according to whether the towing is performed or determine at least one of second shift patterns as the basic shift pattern so as to correspond to the road inclination (grade) and a weight parameter.

14. The apparatus according to claim 13, wherein the first shift patterns and the second shift patterns comprise different shift patterns.

15. The apparatus according to claim 13, wherein a first threshold value to be compared with the road inclination (grade) and a second threshold value to be compared with the road inclination (grade) and the weight parameter are different.

16. The apparatus according to claim 13, wherein:
the first shift patterns and the second shift patterns comprise the same shift pattern; and
the first threshold value to be compared with the road inclination (grade) and the second threshold value to be compared with the road inclination (grade) and the weight parameter are the same.

17. The apparatus according to claim 8, wherein the energy compensation determination unit is configured to recognize an amplitude of the vehicle, calculate whether an electronic device comprising an air conditioning system and an audio-video-navigation system installed in the vehicle is used and power consumption of the electronic device, determine operating load based on user operating preference information according to driving environment information and, then, determine the first energy consumption so as to correspond to the amplitude, whether the electronic device is used, power consumption of the electronic device, and the operating load.

18. The apparatus according to claim 8, wherein the energy compensation determination unit is configured to determine operating load based on the vehicle speed and the road inclination and determine the second energy consumption according to the operating load.

19. The apparatus according to claim 8, wherein the shift pattern determination unit is configured to add the first energy consumption to a low power state entrance threshold value to determine a first parameter, add the second energy consumption to the low power state entrance threshold value to determine a second parameter, determine an SoC of a battery installed in the vehicle as a third parameter and, then, compare the first parameter, the second parameter, and the third parameter to determine the energy compensation pattern.

20. The apparatus according to claim 19, wherein:
when the third parameter is greater than the first parameter and the second parameter, the energy compensation pattern is determined to maximize fuel efficiency or energy efficiency;
when the third parameter is smaller than the first parameter or the second parameter, the energy compensation pattern is determined to reduced fuel consumption or energy consumption; and
the energy compensation pattern when the third parameter is smaller than the second parameter has smaller fuel consumption or energy consumption than the energy compensation pattern when the third parameter is smaller than the first parameter.

* * * * *